(12) United States Patent
Hornbostel et al.

(10) Patent No.: US 9,073,005 B2
(45) Date of Patent: Jul. 7, 2015

(54) FALLING MICROBEAD COUNTER-FLOW PROCESS FOR SEPARATING GAS MIXTURES

(75) Inventors: Marc D. Hornbostel, Palo Alto, CA (US); Gopala N. Krishnan, Sunnyvale, CA (US); Angel Sanjurjo, San Jose, CA (US)

(73) Assignee: SRI International, Menlo Park, CA (US)

( * ) Notice: Subject to any disclaimer, the term of this patent is extended or adjusted under 35 U.S.C. 154(b) by 121 days.

(21) Appl. No.: 13/489,586

(22) Filed: Jun. 6, 2012

(65) Prior Publication Data

US 2012/0325088 A1 Dec. 27, 2012

Related U.S. Application Data

(60) Provisional application No. 61/495,196, filed on Jun. 9, 2011.

(51) Int. Cl.
| | |
|---|---|
| *B01D 53/02* | (2006.01) |
| *B01D 53/10* | (2006.01) |
| *F23J 15/02* | (2006.01) |
| *B01D 53/08* | (2006.01) |

(52) U.S. Cl.
CPC ............ *B01D 53/10* (2013.01); *F23J 15/02* (2013.01); *B01D 2253/102* (2013.01); *B01D 2257/504* (2013.01); *B01D 2258/0283* (2013.01); *B01D 2259/4009* (2013.01); *Y02C 10/08* (2013.01); *F23J 2215/50* (2013.01); *F23J 2219/60* (2013.01); *B01D 53/08* (2013.01); *B01D 2253/302* (2013.01); *B01D 2253/34* (2013.01); *B01D 2256/245* (2013.01); *B01D 2257/406* (2013.01); *B01D 2258/012* (2013.01); *B01D 2258/0216* (2013.01)

(58) Field of Classification Search
CPC ........ B01D 24/28; B01D 24/36; B01D 53/08; B01D 53/10; B01D 53/12; B01D 2253/102; B01D 2257/504; B01D 2258/0283; B01D 2259/4009; Y02C 10/08
USPC .......................................... 95/107–112, 139
See application file for complete search history.

(56) References Cited

U.S. PATENT DOCUMENTS

| | | | |
|---|---|---|---|
| 2,544,214 A | 3/1951 | Berg | |
| 2,635,706 A | 4/1953 | Gilmore | |
| 2,859,257 A * | 11/1958 | Hess et al. | ................ 208/310 R |
| 4,219,537 A | 8/1980 | Steiner | |
| 4,247,987 A * | 2/1981 | Coulaloglou et al. | .......... 34/249 |

(Continued)

FOREIGN PATENT DOCUMENTS

EP 0 770 419 A2 2/1997

OTHER PUBLICATIONS

International Search Report for International Patent Application Serial No. PCT/US12/41717, dated Aug. 28, 2012, consists of 5 unnumbered pages.

(Continued)

*Primary Examiner* — Christopher P Jones

(57) ABSTRACT

A method and reactor for removing a component from a gas stream is provided. In one embodiment, the method includes providing the gas stream containing the component that is to be removed and adsorbing the component out of the gas stream as the gas stream rises via microbeads of a sorbent falling down an adsorber section of a reactor.

16 Claims, 6 Drawing Sheets

(56) References Cited

U.S. PATENT DOCUMENTS

| | | | |
|---|---|---|---|
| 4,255,166 A * | 3/1981 | Gernand et al. | 95/27 |
| 5,383,955 A * | 1/1995 | Neal et al. | 95/34 |
| 6,083,298 A | 7/2000 | Wang et al. | |
| 6,149,875 A * | 11/2000 | Rao et al. | 422/144 |
| 6,171,370 B1 * | 1/2001 | Hirano et al. | 95/96 |
| 6,387,337 B1 | 5/2002 | Pennline et al. | |
| 6,475,461 B1 * | 11/2002 | Ohsaki et al. | 423/445 R |
| 6,527,830 B1 * | 3/2003 | Neu et al. | 95/98 |
| 6,656,344 B1 * | 12/2003 | Rao et al. | 208/113 |
| 7,374,734 B2 | 5/2008 | Grossman et al. | |
| 8,282,714 B2 * | 10/2012 | Carruthers | 96/108 |
| 8,353,978 B2 | 1/2013 | Knaebel | |
| 2006/0230930 A1 * | 10/2006 | Knaebel | 95/96 |
| 2011/0017493 A1 | 1/2011 | Gibson et al. | |
| 2011/0041688 A1 | 2/2011 | Eisenberger | |
| 2012/0122195 A1 * | 5/2012 | Fradette et al. | 435/266 |
| 2012/0214219 A1 * | 8/2012 | Aines et al. | 435/174 |

OTHER PUBLICATIONS

Extended European Search Report for European Application Serial No. 12797164.6, dated Oct. 14, 2014, consists of 6 unnumbered pages.

* cited by examiner

FALLING MICROBEAD COUNTER-FLOW PROCESS FOR SEPARATING GAS MIXTURES

RELATED APPLICATIONS

This application claims priority under 35 U.S.C. §119(e) to U.S. provisional patent application Ser. No. 61/495,196, filed on Jun. 9, 2011, which is hereby incorporated by reference in its entirety.

REFERENCE TO GOVERNMENT FUNDING

This invention was made with Government support under Contract No. DE-NT0005578, awarded by the Department of Energy (NETL). The Government has certain rights in this invention.

FIELD OF THE INVENTION

The present disclosure relates generally to a falling microbead process for adsorptive separation of gas mixtures and to purification of gases by the adsorptive separation of impurities and equivalents thereof.

BACKGROUND

Separation of gas mixtures can be necessary for a variety of reasons. In some processes, the products are produced as a mixture of gases, e.g., the separation of ethylene from a refinery gas stream for the production of polyethylene. In other processes, a waste stream must be treated to remove environmental pollutants before the stream can be released. In another example, volatile solvents can be recovered for reuse in a process by separating the solvent vapors from an exhaust stream. In another example, greenhouse gas emissions from power plants can be eliminated by separating carbon dioxide ($CO_2$) from the flue gas and providing a pure stream of $CO_2$ that is suitable for sequestration.

Current separation processes are inefficient and expensive. For example, pressure swing processes have the disadvantage of high cost due to the need to raise and lower the process gas stream pressure. Temperature swing processes have the disadvantage that efficient heating and cooling of the sorbent can be difficult because high surface area solids generally have poor heat transfer properties.

SUMMARY

In one embodiment, a method for removing a component from a gas stream is provided. In one embodiment, the method comprises providing the gas stream containing the component that is to be removed and adsorbing the component out of the gas stream as the gas stream rises via microbeads of a sorbent falling down an adsorber section of a reactor.

In one embodiment, a second method for removing a component from a gas stream is provided. In one embodiment, the method comprises providing the gas stream containing the component that is to be removed, adsorbing the component out of the gas stream as the gas stream rises via microbeads of a sorbent falling down an adsorber section of a reactor, heating the sorbent in a stripper section of the reactor to release the component out of the sorbent and cooling the sorbent and recycling the sorbent back into the adsorber section of the reactor to perform the adsorbing step.

In one embodiment, a reactor for removing a selected component from a gas stream is provided. In one embodiment, the reactor comprises an adsorber section having downward falling microbeads of a sorbent as the gas stream is fed upwards, a transition section coupled to the adsorber section to remove other components from the sorbent and a stripper section coupled to the transition section to remove the selected component from the sorbent.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure provides a falling microbead process for adsorptive separation of gas mixtures, e.g., carbon dioxide ($CO_2$), from a flue gas, and purification of gases by the adsorptive separation of impurities, e.g., boron trichloride from chiorosilanes, and equivalents thereof. The falling microbead process disclosed herein provides a more efficient way of removing components from gas mixtures over currently available technology.

Figure 1:
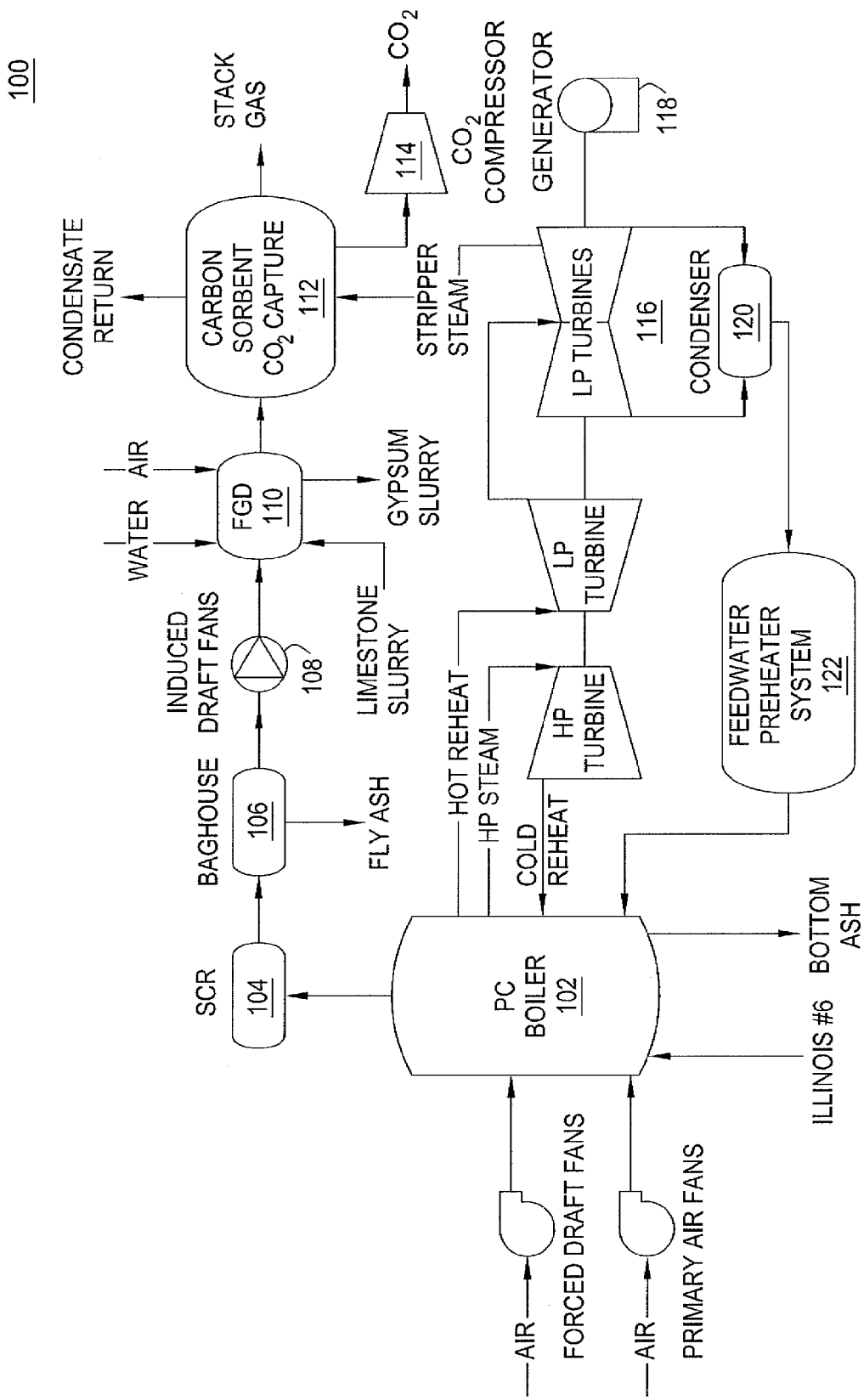
FIG. 1 illustrates one embodiment of a process flow diagram of a power plant equipped with carbon sorbent technology.

FIG. 1 illustrates one embodiment of a process flow diagram 100 of a power plant equipped with carbon sorbent technology. In one embodiment, the power plant utilizes combustion of carbon rich fuels that produces large amounts of $CO_2$. Release of $CO_2$ into the atmosphere is undesirable.

In one embodiment, coal (e.g., pulverized Illinois #6 coal) is fed into a boiler 102 where it is combusted in the presence of air. The hot flue gas is passed over the heat exchangers where it is cooled and then it is sent to $NO_x$ and $SO_x$ removal steps. The flue gas is passed through a selective catalytic reduction (SCR) unit 104 where $NO_x$ is reduced with ammonia ($NH_3$) to nitrogen gas ($N_2$) and water ($H_2O$). The flue gas then passes to a baghouse 106 where fabric filters are used to remove the fly ash. Induced draft fans 108 are used to feed the flue gas to a flue gas desulfurization (FGD) unit 110 where sulfur dioxide ($SO_2$) is reacted with limestone and air to form calcium sulfites and sulfates (gypsum). The gypsum is separated out and the flue gas is then fed to a reactor 112. The $CO_2$ is separated out of the flue gas (now mostly N2, O2 and residual steam) in the reactor 112 and sent to a $CO_2$ compressor 114 for use as a chemical feedstock or for sequestration. The $CO_2$ lean flue gas is sent to a stack and vented to the atmosphere.

The steam cycle generated by the boiler 102 is used to turn a turbine 116, which powers a generator 118 to produce electricity. The steam is recycled via a condenser 120 and a feedwater pre-heater system 122 to complete the process flow 100.

Figure 2:
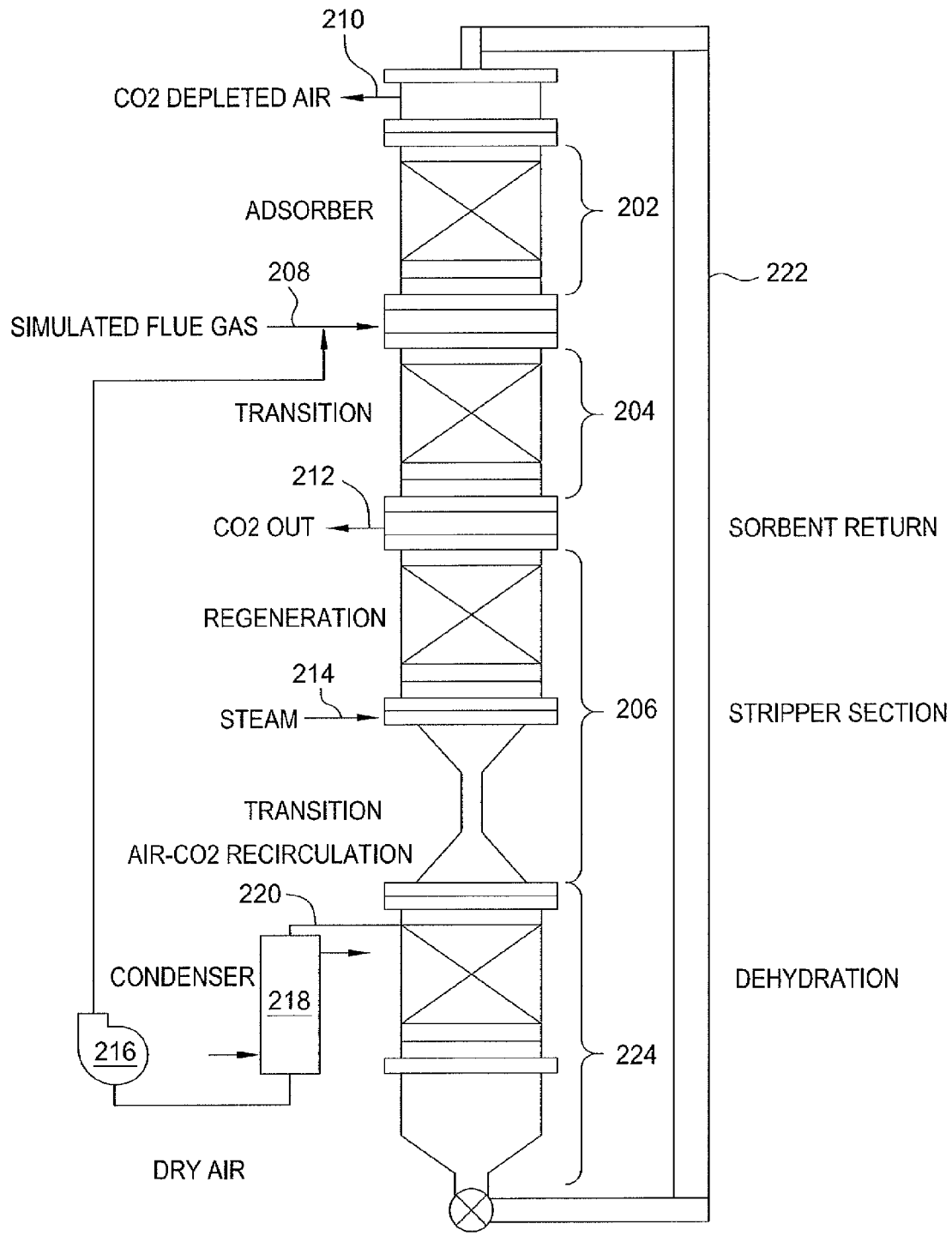
FIG. 2 illustrates one embodiment of a carbon sorbent reactor.

FIG. 2 illustrates a more detailed block diagram of the reactor 112. The reactor 112 may also be referred to as a falling microbead reactor. The reactor 112 includes an adsorber section 202, a transition section 204, a stripper section 206 and a dehydration/cooling section 224.

In one embodiment, the reactor 112 provides a continuous process that uses a falling microbead system. In one embodiment, as the flue gas enters the reactor 112 via stream 208, the flue gas flows upwards as a solid sorbent falls down the column, moving counter to the gas flow.

In one embodiment, the solid sorbent may be designed to be hard and attrition resistant to allow the sorbent to be cycled many times through the reactor. The sorbent may have a high preference for removing a particular component from the entering gas and a high capacity for the particular component that is to be removed. The sorbent should have rapid adsorption and desorption rates, a low heat of adsorption and desorption, high hydrothermal stability, low heat capacity and high thermal conductivity. The sorbent may be chosen to be spherically-shaped granular material to allow the solid to flow smoothly down the column.

In one embodiment, where the particular component to be removed is $CO_2$, the sorbent may comprise a high surface area carbon based sorbent, e.g., advanced carbon sorbent (ACS). Although ACS is used as the sorbent in one embodiment, it should be noted that any type of gas mixture may be separated with any type of sorbent meeting the characteristics described above. For example, the present process and reactor system may also be used to remove $CO_2$ from exhaust gas from coal plants, gas turbines, diesel engines and similar combustion systems.

This type of reactor process could also be used for removal of $CO_2$ from natural gas sources or from synthetic or reforming gases or from a Fisher-Tropsch Tropsch gas exhausts or recirculation loops. This system could also be used in semiconductor applications to purify or to separate gases. For example, halides of Si, such as $SiF_4$, chlorosilanes, bromosilanes and doping gases such $BF_3$, $BCl_3$, $PCl_5$, $OPCl_3$ can be separated or purified. Equally, hydrides such as silanes, boranes or phosphines could be purified using this system.

The system could also be used to remove $NH_3$ from dairy or feed lot cattle systems. The system could also be used to remove bad odor producing molecules from industrial sites, hospitals or animal husbandry operations.

ACS exhibits the desired characteristics of a sorbent noted above. For example, ACS has a high capacity for $CO_2$ (approximately 20 weight % at 1 atmosphere (atm) $CO_2$) and has a good selectivity for $CO_2$ over other flue gas constituents. The adsoprtion of $CO_2$ occurs in the micropores of the sorbent with very low activation energy (approximately <5 kiloJoules (kJ)/mole), allowing rapid cycling of the sorbent. The relatively low heat of desorption (28 kJ/mole) indicates that this process has a low heat demand for regeneration. Direct heating with steam can be used for $CO_2$ desorption. The ACS that has been regenerated at the moderately elevated temperature can be cooled by evaporative cooling of moisture adsorbed on the sorbent. Direct heating and cooling limits the need for gas to solid heat exchangers, thereby, simplifying the process. A large volume of flue gas can be separated with a small inventory of sorbent.

The sorbent lifetime may last for more than 50,000 adsorption/desorption cycles per year. The spherical nature of the ACS granules (approximately 100 to 300 microns (μm) in diameter) allows a smooth flow on an inclined surface, like a ball bearing. This free-flowing, liquid-like characteristic of the ACS allows the use of commercially available structural packing as the gas-solid contacting device. The low heat capacity of the sorbent (approximately 1 Joule (J)/gram (g)/Kelvin (K)), as compared to that of water, minimizes the thermal energy needed to heat the ACS to the regeneration temperature. The ACS thermal conductivity of 0.8 watt (w)/meter(m)-K enables rapid thermal equilibrium between the surface and interior of the microbeads. The ACS is essentially hydrophobic, indicating weak interaction between the condensed water and the ACS. The thermal energy required to desorb the condensed water is significantly less than that required to evaporate water from oxide surfaces such as those found in molecular sieves (zeolites), alumina, and silica.

The adsorber section 202 may include a structural packing. The structural packing may be designed to promote better absorption of the $CO_2$ out of the flue gas and into the sorbent.

The packing material also helps to maintain a uniform flow of both the gas mixture and the solid sorbent. This provides a good contact between the gas and the solid sorbent with minimum pressure drop.

The design of the adsorber section 202 provides a relatively low pressure drop, e.g., approximately between 0.1 in $H_2O$/ft packing to 1.0 in $H_2O$/ft packing. For example, at an air velocity of approximately 2.4 feet(ft)/second (s), the measured pressure drop was approximately 0.4 in $H_2O$/ft packing (0.014 psi/ft). The low pressure drop is important due to the large volume of flue gas produced in a power plant. This low pressure drop is in sharp contrast to traditional reactors that use a fixed, dense moving, or a fluidized bed of sorbent granules that result in a high pressure drop for gas flow. A high pressure drop increases the cost of the $CO_2$ capture. Thus, the low pressure drop provides better efficiency and lower cost.

In addition, the use of the proper sorbent (e.g., ACS for $CO_2$ removal) allows for rapid cycling of the sorbent due to the rapid $CO_2$ adsoprtion and desorption kinetics and excellent attrition resistance properties of the ACS sorbent. This allows a compact reactor design, which in turn will reduce the capital cost of the system.

Figure 5:
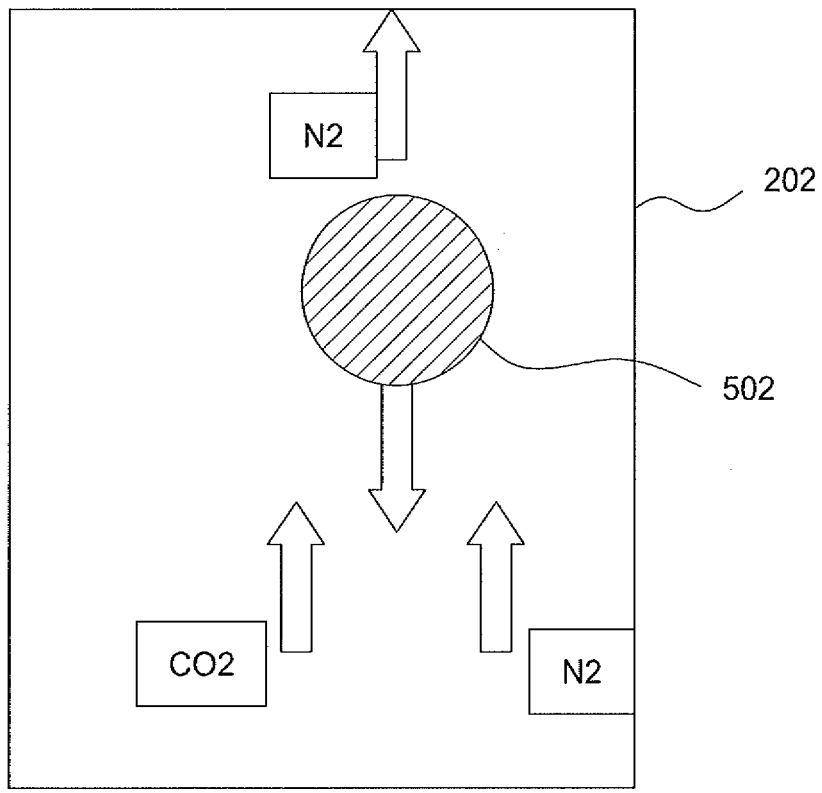
FIG. 5 illustrates a block diagram of an absorption section of the carbon sorbent reactor.

Referring back to FIG. 2, as the flue gas rises through the adsorber section 202, the sorbent microbeads fall down the adsorber section 202. This is illustrated at a high level in FIG. 5. FIG. 5 illustrates how the sorbent microbeads 502 fall downward as the flue gas rises upwards in the adsorber section 202.

Figure 6:
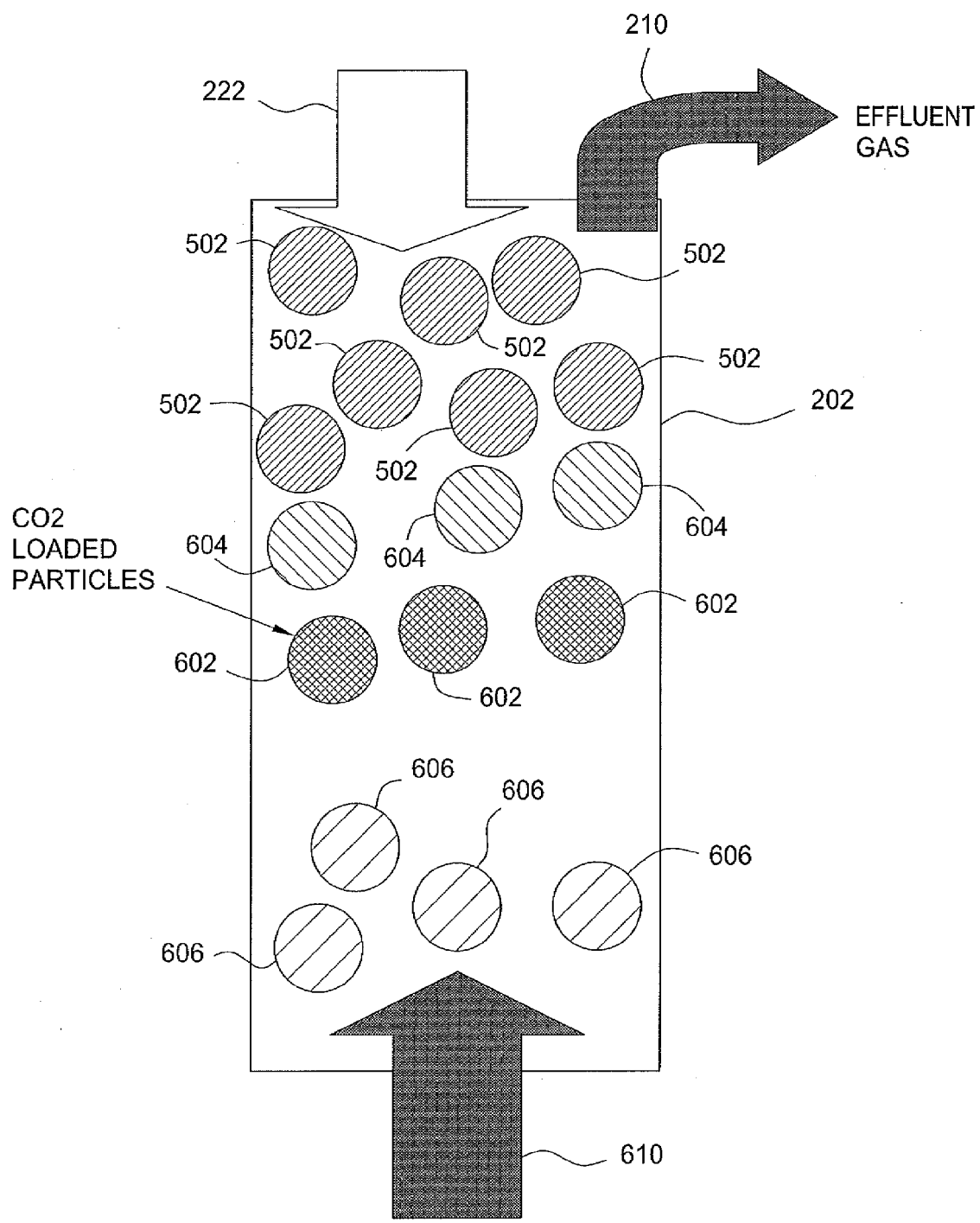
FIG. 6 illustrates a more detailed diagram of the absorption section.

The $CO_2$ is removed from the rising flue gas and the $CO_2$ depleted gas is removed via a stream 210. The sorbent microbead may also capture some $N_2$ and $O_2$ from the flue gas stream 208. This process is illustrated in more detail by FIG. 6. FIG. 6 illustrates sorbent microbeads 502 being added via stream 222. As the sorbent microbeads 502 enter via stream 222 and fall down the adsorber section 202, the sorbent microbeads 502 contact flue gas, entered via stream 610, with increasing concentration of $CO_2$, causing the sorbent microbeads 502 to adsorb more $CO_2$. Microbeads 606 contain more adsorbed $CO_2$ than microbeads 602 which in turn contain more $CO_2$ than microbeads 604, which in turn contain more $CO_2$ than the sorbent microbeads 502. In contrast, the concentration of $N_2$ and $O_2$ decreases as the sorbent microbeads 502 move down the adsorber section 202, causing the sorbent microbeads 502 to release adsorbed $N_2$ and $O_2$ which are removed with the effluent stream 210. In one embodiment, the adsorption may take place in the adsorber section 202 at near an ambient temperature (e.g., about 20° C. to 30° C.) at approximately 1 atm of pressure.

The $CO_2$ rich sorbent microbeads fall down towards the transition section 204. The transition section 204 is used to desorb the reamaining adsorbed $N_2$ and $O_2$. The $N_2$ and $O_2$ are desorbed when the solid sorbent meets and upward flowing stream of pure $CO_2$ from the bottom stripper section 206. The desorbed $N_2$ and $O_2$ are swept back into the adsorber section 202 to be mixed with the $CO_2$ depleted gas stream 210. The upward flowing stream of $CO_2$ is adsorbed by the sorbent microbeads and carried back down into the stripper section 206.

As the sorbent microbeads move down the transition section 204, the sorbent microbeads encounter an increasing partial pressure of $CO_2$ and a decreasing partial pressure of light gases. This causes the sorbent microbeads to adsorb more $CO_2$ and to desorb the $N_2$ and $O_2$. At the base of the transition section 204, the sorbent is saturated with pure $CO_2$.

In the stripper section 206, steam is introduced via stream 214. In one embodiment, the steam is at approximately 1 bar pressure. The steam is adsorbed causing the temperature of the sorbent to rise, which results in desorption of the $CO_2$. The steam also acts to reduce the partial pressure of $CO_2$, enhancing additional removal of $CO_2$. The desorbed $CO_2$ flows up out of the stripper where it is extracted as pure $CO_2$ via stream 212.

In the dehydration/cooling section 224, the sorbent microbeads are collected and then cooled and regenerated by contacting the sorbent microbeads with cool, dry air via stream 220. The sorbent microbeads are cooled by thermal contact with the air, causing the air to become hot, and by evaporation of the adsorbed water vapor, causing the air to become humid. The hot, humid air is cooled and dried in condenser 218 and pumped by pump 216 to be returned to the adsorber section 202 to capture any remaining $CO_2$.

The cool and dry sorbent is then returned to the top of the reactor 112 in the adsorber section 202 to start the cycle again via the sorbent return line 222. In one embodiment, the reactor 112 may include any means for returning the sorbent from the stripper section 206 back to the adsorber section 202. In one embodiment, the means may include mechanical means, such as for example, a conveyor, an elevator, a pneumatic lift, and the like.

The rapid kinetics of both adsorption and desorption steps allow very short duration in the adsorber section 202 and the stripper section 206. For example, the residence time may be approximately 6-10 seconds when approximately 1-20 kg of sorbent is added for every 1 kg of gas.

Figure 3:
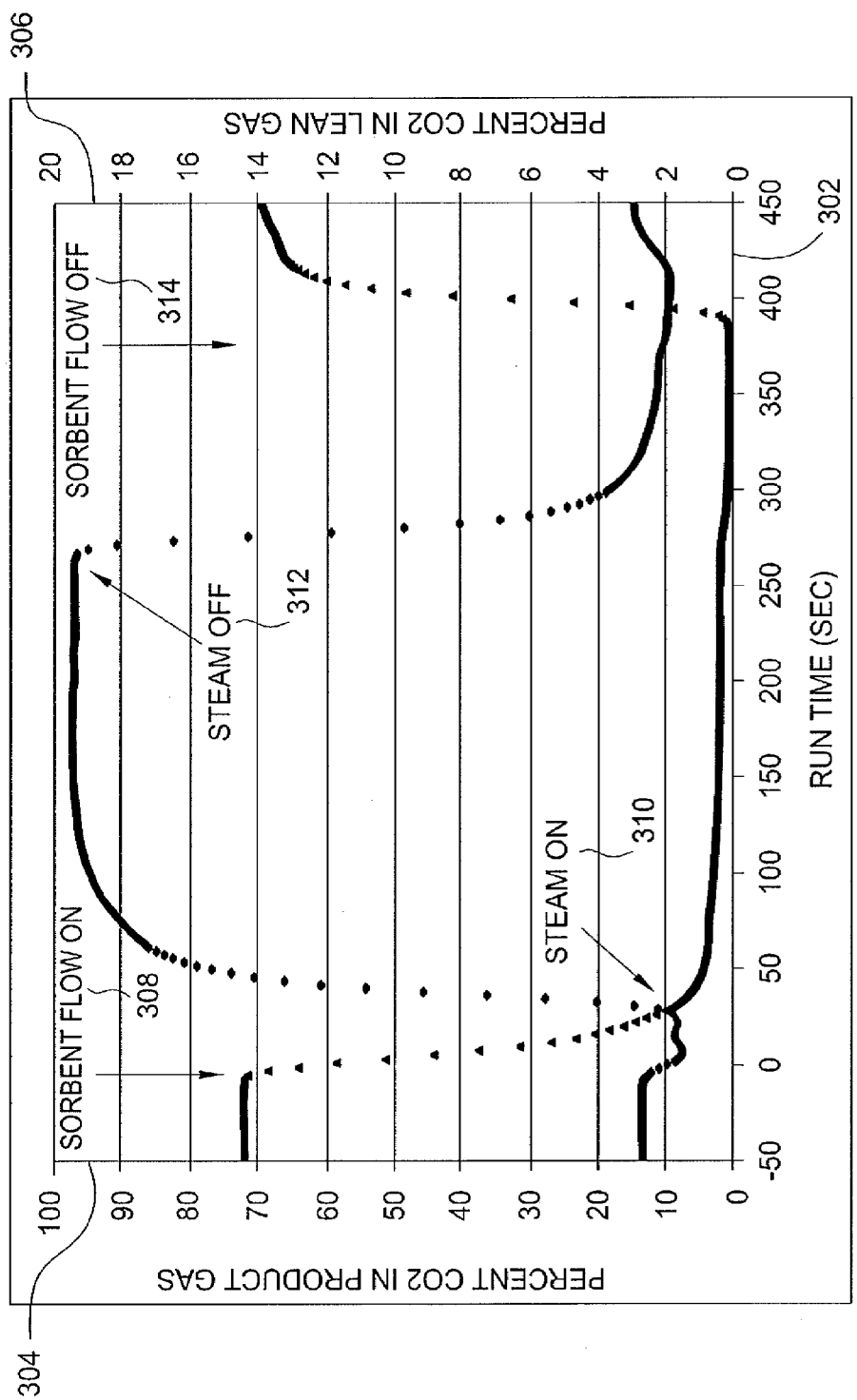
FIG. 3 illustrates a graph depicting a composition of gas leaving the reactor and a stripper.

FIG. 3 illustrates a graph 300 depicting the effectiveness of the sorbent microbead shower and the steam stripping in separating a feed gas stream of 15% $CO_2$ into a lean gas stream with no $CO_2$ and a product gas stream of pure $CO_2$. The x-axis 302 represents run time in seconds, the y-axis 304 represents percent $CO_2$ in the product gas leaving the stripper section 206 shown by the line of diamonds and the y-axis 306 represents the percent $CO_2$ in the lean gas stream 210 exiting the adsorber section 202 shown by the line of triangles. With respect to the adsorber section 202, at time 308 the sorbent flow is turned on. As illustrated by the graph with respect to the y-axis 306, within a few seconds the amount of $CO_2$ in the lean gas stream quickly falls. At time 314 the sorbent flow is turned off and the amount of $CO_2$ in the lean gas stream quickly rises again.

With respect to the stripper section 206 as shown by the y-axis 304, at time 310 the steam is turned on. On introduction of the steam, the $CO_2$ is quickly desorbed from the sorbent and the concentration of the $CO_2$ gas in the product gas stream 212 quickly rises and the product stream becomes pure $CO_2$. At time 312, when the steam is turned off, the concentration of the $CO_2$ gas quickly drops again.

Figure 4:
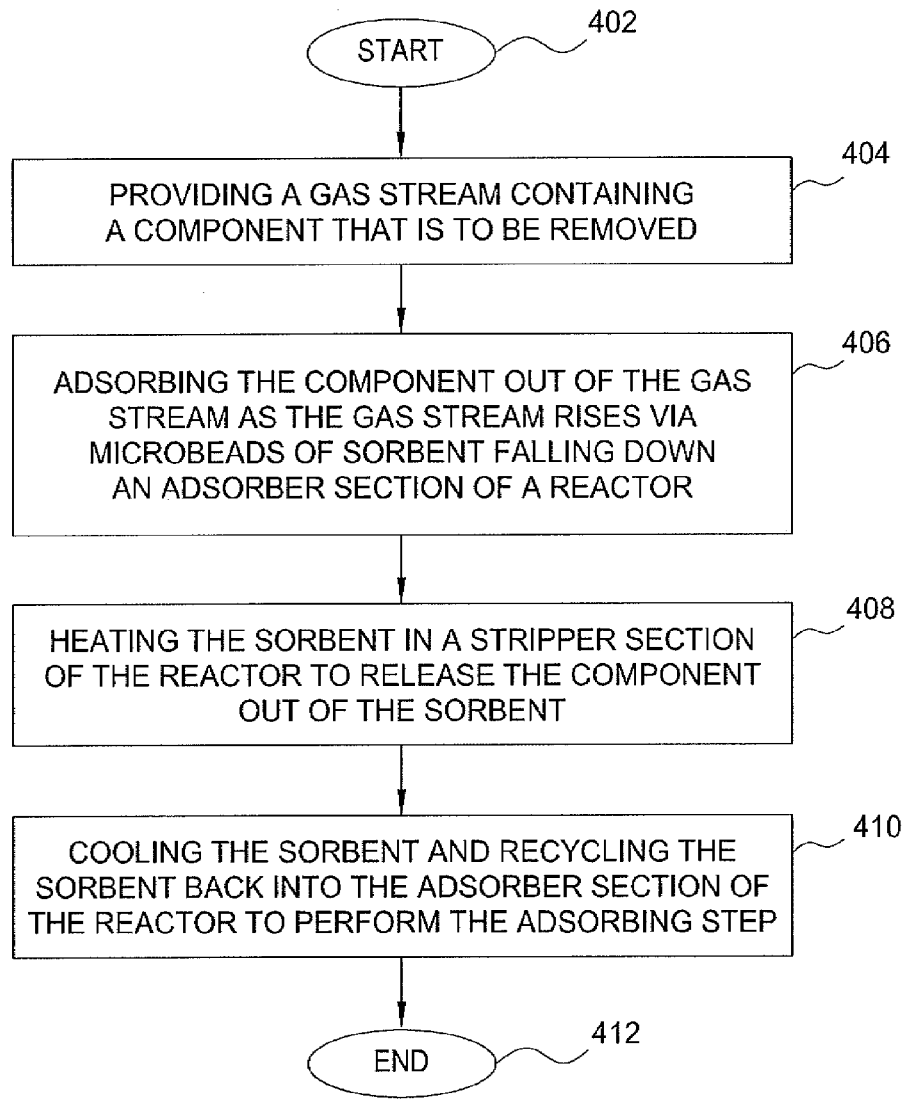
FIG. 4 illustrates a flow diagram for removing a particular component from a gas stream.

FIG. 4 illustrates a flow diagram for a method 400 for removing a particular component from a gas stream. In one embodiment, the method 400 may be carried out by the reactor 112 described above.

The method begins at step 402. At step 404, the method 400 provides a gas stream containing a component that is to be removed. For example, the gas stream may be a flue gas stream of a power plant having a high $CO_2$. The component to be removed may be the $CO_2$ in the flue gas stream.

At step 406, the method 400 adsorbs the component out of the gas stream as the gas stream rises via microbeads of sorbent falling down an adsorber section of a reactor. The microbeads of sorbent and the gas stream may flow through a structured packing material for active mixing of the gas stream and the microbeads of sorbent as they pass through the adsorber section. In one embodiment, the sorbent may be an ACS sorbent as described above.

At step 408, the method 400 heats the sorbent in a stripper section of the reactor to release the component out of the sorbent. For example, hot steam may be used to heat the sorbent to release the adsorbed $CO_2$ out of the sorbent. The $CO_2$ may then be removed via pure $CO_2$ gas stream.

At step 410, the method 400 cools the sorbent and recycles the sorbent back into the adsorber section of the reactor to perform the adsorbing step. For example, dry air or cooled re-circulated $CO_2$ lean gas may be used to cool and dry the sorbent. The vapor may be desorbed and the sorbent may be cooled by evaporative cooling. The sorbent may then be fed back to the adsorber section to repeat the adsorption of the component out of the gas stream in step 406 above. The method 400 ends at step 412.

Examples of the above process are provided below with example operating ranges. The example may be discussed in combination with FIGS. 1 and 2. The examples discussed below were run in a reactor system that was approximately 20 feet tall having approximately a 6 inch diameter.

In one example, $CO_2$ was removed from a simulated flue gas as would be produced by a coal fired power plant. The major non-condensable components are nitrogen (~68%), carbon dioxide (~15%) and oxygen (~17%).

The high surface area activated carbon sorbent used in this process has a selectivity for $CO_2$ over $N_2$ and $O_2$ of about 10:1. Therefore, in this process, $N_2$ and $O_2$ form the top fraction and $CO_2$ is separated into the bottom fraction.

At the simulated flue gas $CO_2$ concentration of 15% the carbon sorbent adsorbs 5-6 wt % (kg of $CO_2$ per kg of carbon sorbent). Under the parameters discussed in the present example, the adsorber section 202 residence time of approximately 5 to 6 seconds was enough to efficiently separate $CO_2$ (e.g., over 90% capture efficiency) from the flue gas. The carbon sorbent flow into the top of the reactor 112 is set to 5 kg of sorbent per kg of flue gas so that it will completely adsorb the $CO_2$ from the flue gas.

The sorbent continues down the column of the reactor 112 and is exposed to an upward flow of pure $CO_2$ from the stripper section 206. In this section, the small amount of $N_2$ and $O_2$ that was adsorbed in the adsorber section 202 is released and returned to the adsorber section 202, eventually to be vented with the top fraction. As the sorbent enters the top of the stripper section 206, it is saturated with pure $CO_2$. The product pure $CO_2$ (e.g., greater than 90% purity) is removed from the reactor 112 at the transition section 204 via the stream 212.

The sorbent continues to flow down into the stripper section 206 where it meets a counter flow of steam at a pressure of 1 bar. The steam is adsorbed, causing the sorbent to heat to above 110° C. At this temperature and in an atmosphere of pure steam, the adsorbed $CO_2$ is desorbed, producing an upward flow of $CO_2$ gas.

The sorbent then flows down to the cooling section of the stripper section 206, where a small flow of dry air is used to desorb the adsorbed water vapor, cooling the solid to near ambient temperature. The sorbent is now returned to the top of the reactor 112 with a pneumatic conveyor. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for removing a component from a gas stream, comprising:
    providing the gas stream containing the component that is to be removed;
    adsorbing the component out of the gas stream as the gas stream rises via microbeads of a sorbent falling down a structural packing of an adsorber section of a reactor;
    directly heating the microbeads of the sorbent with steam to desorb the component that is to be removed;
    directly cooling the microbeads of the sorbent with air after the component is removed; and
    recycling the microbeads of the sorbent to the adsorber section of the reactor.

2. The method of claim 1, wherein the component to be removed comprises carbon dioxide ($CO_2$).

3. The method of claim 1, wherein the sorbent comprises a carbon based sorbent.

4. The method of claim 3, wherein the sorbent comprises a spherical shaped granular material.

5. The method of claim 4, wherein the sorbent comprises an advanced carbon sorbent (ACS).

6. The method of claim 1, wherein approximately 1-5 kilograms (kg) of the sorbent is added per 1 kg of the gas stream.

7. The method of claim 1, wherein the sorbent is falling down and the gas is provided at a rate such that a residence time in the adsorber section is approximately 6-10 seconds.

8. A method for removing a component from a gas stream, comprising:
    providing the gas stream containing the component that is to be removed;
    adsorbing the component out of the gas stream as the gas stream rises via microbeads of sorbent falling down a structural packing of an adsorber section of a reactor;
    heating the sorbent directly with steam in a stripper section of the reactor to release the component out of the sorbent;
    removing the component from the stripper section; and
    cooling the sorbent directly with air in a dehydration/cooling section; and
    recycling the sorbent back into the adsorber section of the reactor to perform the adsorbing.

9. The method of claim 8, wherein the component to be removed comprises carbon dioxide ($CO_2$).

10. The method of claim 8, wherein the sorbent comprises a carbon based sorbent.

11. The method of claim 10, wherein the sorbent comprises a spherical shaped granular material.

12. The method of claim 11, wherein the sorbent comprises an advanced carbon sorbent (ACS).

13. The method of claim 8, wherein approximately 1-5 kilograms (kg) of the sorbent is added per 1 kg of the gas stream.

14. The method of claim 8, wherein the sorbent is falling down and the gas is provided at a rate such that a residence time in the adsorber section is approximately 6-10 seconds.

15. The method of claim 8, wherein the sorbent is heated to at least 110 degrees Celsius (° C.) in the stripper section with steam at approximately 1 bar.

16. The method of claim 8, wherein the providing, the adsorbing the heating and the cooling are performed continuously.

* * * * *